April 5, 1960  K. L. DE BROSSE ET AL  2,931,940
DISPLAY CENTERING APPARATUS
Filed July 8, 1958

INVENTOR.
Kenneth L. DeBrosse
Walter J. Williams, Jr.
BY
Attorneys

United States Patent Office 2,931,940
Patented Apr. 5, 1960

2,931,940
DISPLAY CENTERING APPARATUS

Kenneth L. De Brosse and Walter J. Williams, Jr., Fort Wayne, Ind., assignors to International Telephone and Telegraph Corporation Application July 8, 1958, Serial No. 747,161

8 Claims. (Cl. 315—22)

The present invention relates to display-centering apparatus, and more particularly to apparatus for centering properly the display on a cathode ray tube or oscilloscope and for indicating the precise center of an orthogonal scanning raster.

In certain instances, it is essential that the display on a cathode ray tube or oscilloscope be precisely centered. If the display is to be used for measurement purposes, it is necessary that the raster pattern be properly correlated with a fixed reference point on the display screen, and it is to this feature of centering that the present invention relates.

It is therefore an object of this invention to provide a display-centering apparatus whereby the display on an oscilloscope or cathode ray tube may be accurately centered.

It is another object of this invention to provide a display-centering apparatus whereby the precise center of the raster pattern may be indicated as a spot of light on an oscilloscope display screen.

In accordance with the present invention there is provided a display-centering apparatus comprising a cathode ray oscilloscope having a beam-controlling electrode, a rotatable actuating device, two angularly spaced sensing devices for producing signals representative of the rotational position of said actuating device, means for scanning the electron beam of the oscilloscope in a horizontal direction, means responsive to the respective signals of said two sensing devices for initiating and terminating the horizontal scanning of said beam, sensing means responsive to said actuating device for generating a signal representative of the center of said horizontal scanning, means for scanning the electron beam between predetermined limits in a vertical direction, means gating the signal of said sensing means to said beam-controlling electrode at the instant said electron beam reaches its mid-position between said vertical limits whereby a spot of light is produced by said oscilloscope in the center of the horizontal and vertical scanning pattern.

The above-mentioned and other features and objects of this invention and the manner of attaining them will become more apparent and the invention itself will be best understood by reference to the following description of an embodiment of the invention taken in conjunction with the accompanying drawings, wherein.

Figure 1:
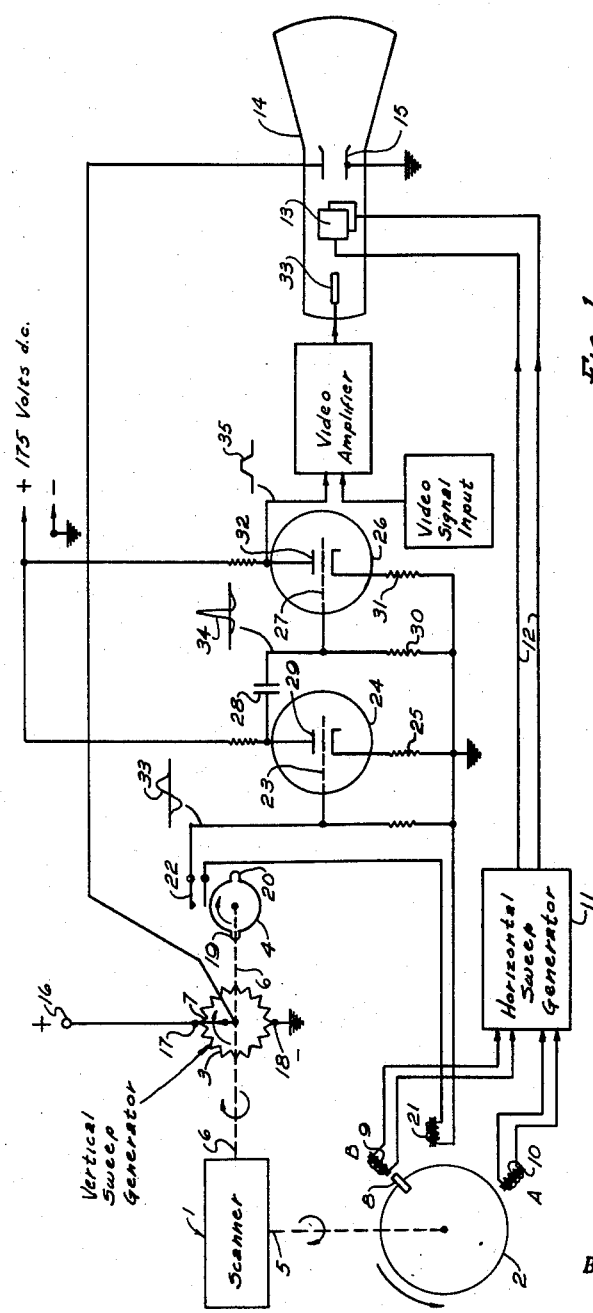
Fig. 1 is a schematic diagram of one embodiment of this invention.

Referring to the drawings, a scanner indicated generally by the reference numeral 1 includes as components thereof a rotatable annular scanning element 2, a rotary potentiometer 3, and a rotary switching cam 4. The scanner 1 further includes a motor and a suitable gear train (not shown) having two rotary output shafts 5 and 6, respectively. The shaft 5 is connected to the scanning element 2 for rotating the same about its axis in the direction of the arrow, and the shaft 6 is connected to the slider or rotor contact 7 of the potentiometer 3 as well as to the cam 4 as shown. For further details as to the precise mechanical construction of the scanner 1 and the included components, reference is made to the co-pending application entitled "Scanning Apparatus" of Kenneth L. De Brosse and John M. Lewis, Disclosure D–1446, Serial No. 748,560, filed July 8, 1958, and assigned to the same assignee.

The scanning element 2 preferably comprises a non-magnetic ring which carries at one point on the periphery thereof a bar magnet or magnetic slug 8. Disposed adjacent the path of rotation of the magnet 8 are two angularly spaced-apart sensing or magnetic pickup devices 9 and 10, respectively, these sensing devices each comprising an inductor having an iron or the like core. These inductors are respectively connected to the input circuit of a horizontal sweep generator 11. For further details as to the construction and operation of this sweep generator 11, reference is made to the co-pending application of Walter J. Williams, entitled "Horizontal Sweep Generator," Disclosure D–1490, application Serial No. 747,283, filed July 8, 1958, and assigned to the same assignee. This horizontal sweep generator produces a linear sawtooth scanning wave which is coupled by means of the lines 12 to the horizontal deflection plates 13 of a conventional electrostatic cathode ray tube or oscilloscope 14.

The rotary potentiometer 3 constitutes the vertical sweep generator, the rotor 7 being connected to the vertical deflection plates 15 of the cathode ray tube, as shown. A suitable fixed source 16 of unidirectional sweep voltage is applied to diametrically opposite points 17 and 18 on the potentiometer 3 so that as the rotor 7 moves from one point 17, 18 to the other, a change in the voltage coupled to the vertical deflection plates 15 will occur.

The rotary cam 4 may be of disc or drum-like construction and carries two diametrically opposed actuating lobes 19 and 20 on the periphery thereof. The connection of the cam 4 with the shaft 6 is preset to align the diameter of the two lobes 19 and 20 at an angle of ninety degrees (90°) with the potentiometer rotor 7. The importance of this 90° displacement will be explained further hereinafter.

A third sensing or pickup element 21, which may be identical to the two sensing elements 9 and 10, respectively, is angularly spaced from and precisely centered between the two pickups 9 and 10. The inductor of this pickup 21 is connected in series with the normally open switch 22 which is engaged and closed by the lobes 19 and 20 on the cam 4. This switch 22 in turn is connected to the control grid 23 of a differentiating amplifier 24, a cathode resistor 25 providing suitable bias for the grid 23.

A clipping amplifier 26 has its control grid 27 coupled by means of a capacitor 28 to the anode 29 of the tube 24 and further is grounded through a resistor 30. The capacitor 28 and the resistor 30 constitute a differentiating circuit, the time constant being selected such as to differentiate the signal produced by the tube 24, as will be more fully explained hereinafter. The cathode resistor 28 provides the necessary bias for the control grid 27.

The output from the clipper 26 is taken from the anode 32 and fed to a conventional video amplifier which is coupled to the control grid or electron gun 33 of the cathode ray tube. This grid 33 is normally biased to cut-off.

In operation, the scanner 1 drives the two shafts 5 and 6 at speeds of, e.g., 2400 and 30 revolutions per minute (r.p.m.), respectively. As the element 2 rotates, voltage pulses are induced in the pickup devices 9 and 10 as the magnet 8 moves there-past. The signal induced in the pickup 10 initiates the sweep generated by the horizontal sweep generator 11 while the signal of the pickup 9 terminates the sweep. Thus, the magnet 8 in rotating past the two pickups 10 and 9 initiates and terminates, respectively, the sweep signal as produced by the horizontal sweep generator. This sweep signal is of conventional sawtooth configuration. This sweep signal as applied to the deflection plates 13 serves the usual function of sweeping the cathode ray beam in a horizontal direction.

As the shaft 6 rotates, the potentiometer arm 7 is rotated therewith, producing a constant change in the amplitude of the potential which is applied to the vertical deflection plates 15. This provides a scanning of the electron beam in a vertical direction. The sweep signal as generated by the potentiometer 3 is not of sawtooth configuration, a gradual ascent and descent of the sweep wave occurring as the rotor 7 moves from the point 17 to the point 18 and thereafter from the point 18 to the point 17, respectively. Thus, this vertical sweep voltage provides, for each revolution of the rotor 7, active sweeps in the cathode ray tube from top to bottom and bottom to top of the display screen.

Since the pickup 21 is positioned at the exact center between the two pickups 9 and 10, the scanning magnet 8 will induce a signal in the pickup 21 which occurs in time precisely at the middle of the horizontal sweep as defined by the two pickups 9 and 10, respectively. Similarly, since the lobes 19 and 20 on the rotary cam 4 are displaced 90° from the rotor 7, the switch 22 will be closed only when the vertical sweep wave is at its midpoint. In other words, the switch 22 is closed only when the vertical sweep has carried the beam of the cathode ray tube to the vertical center of the display screen. Since the rotor 7 and cam 4 rotate at only 30 r.p.m. in contrast with the magnet 8 rotating at 2400 r.p.m., it will be seen that the respective lobes 19 and 20 engage the switch 22 only every fortieth time the magnet 8 passes the pickup 21. Thus, the switch or gating means 22 effectively gates through every fortieth signal generated by the pickup 21. This signal, indicated by the numeral 33, is a sine wave pulse. The tube 24 is biased such that the negative lobe of this signal 33 is substantially removed, the output signal taken from the anode 29 thereupon being coupled to the clipping circuit 26 by the capacitor 28. This capacitor 28, in conjunction with the resistor 30, differentiates the signal and provides a pulse, as indicated by the numeral 34. This pulse 34 is both bottom and top-clipped by the biased tube 26, thereupon providing an output, centering pulse, as indicated by the numeral 35. This output pulse 35 is amplified by the video amplifier and is thereafter fed to the electron gun 33 of the cathode ray tube. Upon the application of this centering pulse 35 to the electron gun 33, the cathode ray beam, previously biased to cut-off, is switched on. At this particular moment, since both the vertical and horizontal sweeps are at their exact centers, the beam will impinge the exact center of the raster pattern on the display screen and thereupon produce a spot of light, as indicated by the numeral 36 in Fig. 2. This spot 36 thereupon indicates the exact center of a display pattern and may be used to center a set of cross-hairs fitted over the face of the display screen from which measurements of a displayed image may be taken.

In the use of two lobes 19 and 20 on the rotary cam, ninety degree (90°) alignment of the lobes with the rotor 7 becomes quite critical. This critical feature is overcome by using only one lobe 19, 20, in which instance the switch 22 is closed only once during each revolution of the rotor 7. Thus, the centering spot on the display screen occurs only once for each top to bottom and bottom to top vertical scan.

Figure 2:
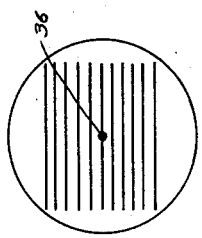
Fig. 2 is a representative illustration of the cathode ray tube display screen with a typical raster pattern indicated thereon.

Fig. 2 illustrates the raster pattern, the horizontal lines indicating the electron beam as it is swept in a horizontal direction. Of course, since the beam is "turned on" only upon the receipt of the centering pulse 35, these lines will not be visible on a display screen.

While we have described above the principles of our invention in connection with specific apparatus, it is to be clearly understood that this description is made only by way of example and not as a limitation to the scope of our invention.

What is claimed is:

1. Display-centering apparatus comprising horizontal sweep signal-generating means, vertical sweep signal-generating means, switching means operatively connected to said vertical sweep means and operative in time coincidence with the center portion only of each of the signals of the horizontal and vertical sweep signal-generating means to generate single electrical pulse, a display device having a spot-producing element and horizontal and vertical sweeping means, said horizontal and vertical sweeping means being operatively coupled to said horizontal and vertical sweep signal-generating means respectively for generating a scanning raster, and means coupling said switching means to said spot-producing element for producing a spot of light on said display device at the center of said scanning raster in response to the occurrence of said electrical pulse.

2. Display-centering apparatus comprising horizontal sweep signal-generating means, vertical sweep signal-generating means, switching means operatively connected to said vertical sweep means and operative in time coincidence with the center portion only of each of the signals of the horizontal and vertical sweep signal-generating means to generate single electrical pulse, a cathode ray display device having an electron beam-forming gun and horizontal and vertical deflecting means, said horizontal and vertical deflecting means being operatively coupled to said horizontal and vertical sweep signal-generating means respectively for generating a scanning raster, and means coupling said switching means to said electron gun for producing a spot of light on said display device at the center of said scanning raster in response to the occurrence of said electrical pulse.

3. Display-centering apparatus comprising a rotary scanning device which carries a magnetic element for rotation therewith, a pair of stationary angularly spaced magnetic pickup devices positioned adjacent the path of rotation of said magnetic element, a horizontal sweep signal generator operatively coupled to said pair of pickup devices and providing a horizontal sweep signal in response to the actuation of said pickup devices, a third magnetic pickup device intermediate said pair of pickup devices and positioned adjacent said path of rotation, said third pickup device producing a signal in response to said magnetic element passing by, a vertical sweep signal generator for producing a vertical sweep signal, an electrical switch, means actuating said switch in synchronism with the operation of said vertical sweep generator, said switch being connected to said third pickup device for providing an electrical signal upon actuation of said switch representative of the signal of said third pickup device, means coupled to said switch for converting said electrical signal into a unidirectional pulse, a cathode ray display device having an electron gun and horizontal vertical deflecting elements, said horizontal and vertical deflecting elements being operatively coupled to said horizontal and vertical sweep generators respectively, and means operatively coupling said converting means to said electron gun whereby a spot of light is produced on said display device in response to the occurrence of said unidirectional pulse, 4. Display-centering apparatus comprising a rotary scanning device which carries a magnetic element for rotation therewith, a pair of stationary angularly spaced magnetic pickup devices positioned adjacent the path of rotation of said magnetic element, a horizontal sweep signal generator operatively coupled to said pair of pickup devices and providing a horizontal sweep signal in response to the actuation of said pickup devices, a third magnetic pickup device centered between said pair of pickup devices and position adjacent said path of rotation, said third pickup device producing a signal in response to said magnetic element, passing by, a vertical sweep signal generator for producing a vertical sweep signal, means synchronizing the operation of said vertical sweep generator with the rotation of said scanning device, an electrical switch, means actuating said switch in response to the occurrence of the center portion of said vertical sweep signal, said switch being connected to said third pickup device for providing an electrical signal upon actuation of said switch representative of the signal of said third pickup device, means coupled to said switch for converting said electrical signal into a unidirectional pulse, a cathode ray display device having an electron gun and horizontal and vertical deflecting elements, said horizontal and vertical deflecting elements being operatively coupled to said horizontal and vertical sweep generators respectively, and means operatively coupling said converting means to said electron gun whereby a spot of light is produced on said display device in response to the occurrence of said unidirectional pulse.

5. Display-centering apparatus comprising a rotary scanning device which carries a magnetic element for rotation therewith, a pair of stationary angularly spaced magnetic pickup devices positioned adjacent the path of rotation of said magnetic element, a horizontal sweep signal generator operatively coupled to said pair of pickup devices and providing a horizontal sweep signal in response to the actuation of said pickup devices, a third magnetic pickup device centered between said pair of pickup devices and positioned adjacent said path of rotation, said third pickup device producing a signal in response to said magnetic element moving thereby, a vertical sweep generator comprising a potentiometer having a rotor operatively connected to said scanning device for corresponding rotation therewith, a fixed potential applied to diametrically opposite points on said potentiometer, a normally open switch operative between open and closed positions, a rotary cam operatively connected to said rotor for synchronous rotation therewith, said cam having at least one lobe displaced ninety degrees (90°) from said rotor, said lobe being operatively engageable with said switch to close the same, said switch being connected in series with said third pickup device, a differentiating circuit coupled to said switch for producing a signal in response to the signal of said third pickup device when said switch is closed, a clipping circuit coupled to said differentiating circuit and producing a unidirectional pulse in response to the signal of said differentiating circuit, a cathode ray tube having an electron gun and horizontal and vertical deflection elements, said horizontal and vertical deflection elements being operatively coupled to said horizontal and vertical sweep generators respectively, and means coupling said clipping circuit to said electron gun for providing a spot of light on said cathode ray tube in response to the occurrence of said unidirectional pulse.

6. The apparatus of claim 5 comprising means for starting and stopping the sweep signal of said horizontal sweep generator as said magnetic element passes said pair of pickup devices respectively.

7. Display-centering apparatus comprising a cathode ray oscilloscope having a beam-controlling electrode, a rotatable actuating device, two angularly spaced sensing devices for producing signals representative of the rotational position of said actuating device, means for scanning the electron beam of said oscilloscope in a horizontal direction, means responsive to the respective signals of said two sensing devices for initiating and terminating the horizontal scanning of said beam, sensing means responsive to said actuating device for generating a signal representative of the center of said horizontal scanning, means for scanning the electron beam between predetermined limits in a vertical direction, means gating the signal of said sensing means to said beam-controlling electrode at the instant said electron beam reaches its mid-position between said vertical limits, whereby a spot of light is produced by said oscilloscope in the center of the horizontal and vertical scanning pattern.

8. Display-centering apparatus comprising a rotary scanning device which carries a magnetic element for rotation therewith, a pair of stationary angularly spaced magnetic pickup devices positioned adjacent the path of rotation of said magnetic element, a horizontal sweep signal generator operatively coupled to said pair of pickup devices and providing a horizontal sweep signal in response to the actuation of said pickup devices, a third magnetic pickup device intermediate said pair of pickup devices and positioned adjacent said path of rotation, said third pickup device producing a signal in response to said magnetic element passing by, a vertical sweep signal generator for producing a vertical sweep signal, gating means, means actuating said gating means in synchronism with the operation of said vertical sweep generator, said gating means including means operatively connected to said third pickup device for providing an electrical signal upon actuation of said gating means representative of the signal of said third pickup device, means coupled to said gating means for converting said electrical signal into a unidirectional pulse, a cathode ray display device having an electron gun and horizontal vertical deflecting elements, said horizontal and vertical deflecting elements being operatively coupled to said horizontal and vertical sweep generators respectively, and means operatively coupling said converting means to said electron gun whereby a spot of light is produced on said display device in response to the occurrence of said unidirectional pulse.

References Cited in the file of this patent

UNITED STATES PATENTS

| | | |
|---|---|---|
| 2,406,858 | Shepherd et al. | Sept. 3, 1946 |
| 2,422,697 | Meacham | June 24, 1947 |
| 2,625,599 | Downes | Jan. 13, 1953 |

FOREIGN PATENTS

| | | |
|---|---|---|
| 601,597 | Great Britain | May 10, 1948 |